US008811205B2

(12) United States Patent
Flanagan

(10) Patent No.: US 8,811,205 B2
(45) Date of Patent: Aug. 19, 2014

(54) WIRELESS COMMUNICATION NETWORK

(75) Inventor: Michael Joseph Flanagan, Chester, NJ (US)

(73) Assignee: JDSU UK Limited, Basingstoke, Hampshire (GB)

( * ) Notice: Subject to any disclaimer, the term of this patent is extended or adjusted under 35 U.S.C. 154(b) by 177 days.

(21) Appl. No.: 13/144,128

(22) PCT Filed: Jan. 9, 2010

(86) PCT No.: PCT/EP2010/000074
§ 371 (c)(1),
(2), (4) Date: Sep. 19, 2011

(87) PCT Pub. No.: WO2010/081659
PCT Pub. Date: Jul. 22, 2010

(65) Prior Publication Data
US 2012/0002563 A1  Jan. 5, 2012

Related U.S. Application Data

(60) Provisional application No. 61/144,249, filed on Jan. 13, 2009.

(51) Int. Cl.
*G01R 31/08* (2006.01)
(52) U.S. Cl.
USPC ........................................................ 370/252
(58) Field of Classification Search
None
See application file for complete search history.

(56) References Cited

U.S. PATENT DOCUMENTS

| 5,293,642 | A  | * | 3/1994 | Lo .............................. 455/456.2 |
| 2007/0207816 | A1 |   | 9/2007 | Spain, Jr. |
| 2008/0188242 | A1 | * | 8/2008 | Carlson et al. .............. 455/456.5 |
| 2009/0109868 | A1 | * | 4/2009 | Chen et al. ..................... 370/254 |
| 2009/0177443 | A1 | * | 7/2009 | Nikovski et al. .............. 702/196 |
| 2009/0221313 | A1 | * | 9/2009 | Rofougaran .................. 455/500 |
| 2009/0312037 | A1 | * | 12/2009 | Jo et al. ........................ 455/456.2 |
| 2010/0165914 | A1 | * | 7/2010 | Cho et al. ..................... 370/328 |
| 2011/0244891 | A1 | * | 10/2011 | Ghinamo .................... 455/456.6 |

FOREIGN PATENT DOCUMENTS

| CN | 1698391 A | 11/2005 |
| WO | 02/054813 A1 | 7/2002 |
| WO | 03/102620 | 12/2003 |

OTHER PUBLICATIONS

English Translation of Notification of the First Office Action and Search Report of counterpart Chinese Patent Application No. 201080011874.7 issued by the State Intellectual Property Office of P.R. China on Jan. 10, 2014.

* cited by examiner

Primary Examiner — John Blanton
(74) Attorney, Agent, or Firm — George Y. Wang

(57) ABSTRACT

The invention relates to a wireless mobile communication system (400), such as a mobile telephone network. Network configuration data may contain inaccuracies, such as an error in the location of a base station (432, 434). These inaccuracies may lead to errors in estimating the location of a mobile communication unit (410). The invention creates probability density functions for the location of a mobile communication unit, based on communications with the mobile communication network (430). A confidence score may be calculated for each probability density function. A combined function can then be derived from the individual confidence scores. Maximization of the combined function may then lead to a corrected value for a network parameter of the network configuration data. Corrected network configuration data leads to more accurate measurements of the location of mobile communication units. In addition, upgrades to the antennae and base stations can be planned more effectively.

17 Claims, 10 Drawing Sheets

WIRELESS COMMUNICATION NETWORK

CROSS-REFERENCE TO RELATED APPLICATIONS

This application claims priority under 35 U.S.C. §119 to U.S. Provisional Application No. 61/144,249, filed Jan. 13, 2009, the entire disclosure of which is incorporated herein by reference.

FIELD OF THE INVENTION

Aspects of the invention relate to network configuration data in a wireless mobile communications system. The invention is applicable to mobile telephone networks, but is not however limited to these networks.

BACKGROUND OF THE INVENTION

A wireless communication unit usually forms part of a wireless communication system. The wireless communication unit communicates through a wireless communication network, which also forms part of the wireless communication system.

The wireless communication network normally comprises a network of base stations. Each base station enables communication within an area referred to as a cell-site. Each cell-site may comprise multiple sectors. There are usually three sectors in a cell-site. Each sector may be served by a dedicated antenna, co-located with the base station.

In some countries, it is a legal requirement that wireless communication systems be able to provide accurate information about the location of wireless communication units. This information may serve, for example, to expedite the arrival of assistance to a user of a wireless communication unit who calls the emergency services, using the '911' number in the United States.

Information about the location of a wireless communication unit can be derived in many ways. At any particular time, various forms of measurement information may be available from:

(i) The wireless communication unit;
(ii) The wireless communication network, and particularly from one or more base stations with which the wireless communication unit is communicating; or
(iii) Both of (i) and (ii).

This measurement information can be processed to provide an estimate of the location of the wireless mobile communication unit.

Considering the measurement information in more detail, this information may be available either:

(i) Directly. This means that the information is included in the measurement made. The measurement may be made either by the wireless communication unit, or by another part of the wireless communication system, such as the wireless network.
(ii) Indirectly. This means that the information is derived from the measurements made. An example would be an estimate of the distance between a wireless communication unit and the base station of a wireless communication system. Such an estimate might be calculated by multiplying the speed of propagation of the signal by a measured time difference between transmission and receipt of a signal.

So some or all of the following mobile measurement information may be available:

(i) The absolute distance(s) from the wireless communications unit to one or more network sectors.
(ii) Differential distances between the wireless communications unit and one or more pairs of network sectors.
(iii) Received signal powers recorded by the wireless communications unit from one or more network sectors.
(iv) Received signal-to-noise ratio measurements recorded by the wireless communications unit from one or more network sectors.

In addition, the following network configuration data may be available:

(i) Antenna locations per sector. This information may be provided in latitude and longitude, or as 'Easting' and 'Northing' directions, or the equivalent.
(ii) Antenna properties. This information may include height above ground, azimuth, tilt, horizontal and vertical beam pattern, transmitted power levels for control and traffic channels.

So prior art geo-location methods have as their inputs various forms of directly- and indirectly derived measurement information. That measurement information may have come from the wireless communication unit, the wireless communication system, or both. A combination of the mobile measurement information and network configuration data is often used to provide geometric interpretations of the mobile device location.

Network configuration data is, however, often in error. For example, the data on the locations of cell sites can be off by hundreds of meters or more. Azimuthal angles of antennae can be off by tens of degrees. These inaccuracies can impede the ability to geo-locate wireless communication units in the network. In addition, inaccurate network configuration data makes it difficult to perform network planning and optimization effectively.

FIG. 1 shows a simple example of a wireless communication system 100. Wireless communication unit 110 communicates with base station 120. Base station 120 is located at coordinates $(x_B, y_B)$. Base station 120 is one of many base stations that together comprise the wireless communication system 100. Base station 120 is the nearest base station to wireless communication unit 110, and is located a distance 'R' from wireless communication unit 110.

FIG. 1 shows one problem with prior art geo-location methods. If the base station 120 has an omni-directional antenna, and no other measurement information is available, then any attempt to provide a single estimate of the location of the wireless communication unit 110 is very difficult. The information available from the wireless communication unit 110 and/or from base station 120 allows prior art geo-location methods to calculate only the absolute value of distance R. This distance is measured relative to the known location of base station 120, at $(x_B, y_B)$. However, all that is known is that the wireless communication unit 110 is located somewhere on a circle of radius R, centred on $(x_B, y_B)$, which is the circle 130 in FIG. 1.

The single estimate of the location would have to be a point chosen at random on the circle 130. The error in this estimate could be up to 2R, because the wireless communication unit might in fact be located on circle 130 at a point diametrically opposite to the estimated location.

In general terms, prior art geo-location techniques usually deliver a single point in space as their estimate of the location of the wireless device. This point may, for example, be described by an x coordinate and a y coordinate, as in FIG. 1. However, such an approach does not give the user information about the reliability of the estimate of the location. Reliability, in this example, means both 'accuracy' and 'precision'.

'Accuracy' concerns whether the estimated location is the correct one, or not. In the example of FIG. 1, it was explained that the measurement of the location of mobile communication unit 110 might be inaccurate by as much as 2R.

'Precision' is the exactness of the measurement. FIG. 1 assumes that the distance R could be determined very precisely, i.e. that an exact value for R could be derived. However, there is in fact an error range associated with the measurement of R itself. The measurement of R is, in reality, imprecise. This is explained further in connection with FIG. 2 below.

Both accuracy and precision depend on the type and quality of data on which the measurement estimate is based. If the measurement estimate is derived using network configuration data, then any error in that data will be likely to lead to inaccuracy or imprecision.

FIG. 2 illustrates the imprecision in the measurement of R. FIG. 2 corresponds generally to the arrangement of FIG. 1. A base station 220 located at point $(X_B, Y_B)$ might measure the distance to a communication unit 210 as R. Circle 230 shows the locus of all points at the distance R, which is the distance from base station 220 at which the mobile is most likely to be located. Due to the measurement collection process, however, the user 210 might actually be at a distance of between (R−e1) and (R+e2) from base station 220. So it is not possible even to say with certainty that the user 210 lies on circle 230.

FIG. 3 illustrates a situation where the network configuration data includes incorrect data about the location of the base station, which causes further inaccuracy. The elements of FIG. 3 correspond to the similarly numbered elements of FIG. 2. However, $(X_B, Y_B)$ are incorrect co-ordinates for the location of the base station. Point $(X_R, Y_R)$ shows the correct location for base station 320. Point $(X_R, Y_R)$ is at a distance d from point $(X_B, Y_B)$.

In the arrangement of FIG. 3, the wireless communication network would calculate the position of communication unit 310 as being at a distance R from the base station 320. Similarly to the situation in FIG. 2, errors arise due to the measurement collection process. The distance d adds to these errors. As a consequence, including all sources of error, the user might actually be at a distance of between (R−e1−d) and (R+e2+d) from base station 320.

An error function describes the probability that communication unit 210 or 310 is located at each particular distance from base station 220 or 320. The error function is usually complex. However, the details of the error function can be determined through a variety of means. One option, which is known in the prior art, is to place calls from a small number of known locations, and compare the measurement data with the known locations. A large number of test calls would be needed to provide a significant reduction in the size of the errors described in connection with FIGS. 2 and 3. Such testing would therefore be expensive, and might have to be repeated frequently.

Summing up the discussion of FIGS. 1-3, there is both inaccuracy and imprecision in the measurement of the location of a mobile communications unit in prior art wireless cellular mobile communications systems. These problems may be significant in many situations, for example:

(i) When received signal strength from an omni-directional antenna is the only measurement data on which an estimate of the position of the mobile communications unit can be made; and (ii) When network configuration data is in error.

In the preceding discussion and the discussion that follows, the term 'communicating' includes a variety of forms of communication. These forms include, but are not limited to, speech or data communication sessions on traffic channels, and communication on the control channel. So, for example, the communication may not require the user of a mobile telephone to actually place or receive a call. The communication may involve, for example, only the intermittent receipt by a mobile telephone of data, for example over the wireless communication system's control channel.

Prior art arrangements for the correction of network configuration data typically involve sending technicians to the cell sites in question. The technicians may use Global Positioning System receivers to determine the latitude & longitude of a base station. They may also use inspection materials, such as compasses and maps, in order to determine antenna azimuths and tilts. These quality control inspections are well known by those practiced in the art. In order to check a whole wireless communications network, it is necessary to send technicians to the tens of thousands of cell sites that a wireless service provider owns. The time and effort involved in such a major program of visits leads to a situation where these site visits tend not to be done very often. Although the installation of a cell site does involve the recording of information that becomes part of the network configuration data, this information can be erroneous. Such errors arise due to the data typically being entered manually. A further source of error arises due to changes made to the network over time, which may not be recorded. Such changes result from optimization of the network and other important objectives.

Prior art U.S. Pat. No. 5,293,642 (Lo) describes a variety of approaches to estimating the location of a mobile communication unit. The approaches involve calculating a probability density function for the location of the mobile communication unit. A mobile station may be in communication with two or more base stations. In this case, several probability density functions can be calculated, each describing the location of the mobile on the basis of measurements received from one of the base stations. These probability density functions may be combined, to provide a joint probability density function.

Prior art United States patent application US2008080429 describes a process of minimum variance location estimation in wireless networks. A probability density function is calculated, and a 'probability surface' is derived from the probability density function. A mean location of a wireless node is calculated from the probability surface.

The prior art arrangements of these two documents provide an alternative to placing test calls within a network. However, the accuracy of the location information that they provide will still be compromised by any errors in the network configuration data that is available to them.

SUMMARY OF THE INVENTION

In accordance with a first aspect of the present invention, there is provided a method of correcting network configuration data in accordance with the description herein. In accordance with a second aspect of the present invention, there is provided a wireless communication system in accordance with the description herein. In accordance with a third aspect of the present invention, there is provided a wireless smartphone in accordance with the description herein. In accordance with a fourth aspect of the present invention, there is provided a computer program product in accordance with the description herein.

The invention provides network configuration data of increased accuracy. By correcting network configuration data, the present invention may offer a number of advantages. In particular the invention may:

(i) Enable the calculation of more accurate values for the location of a wireless communication unit. This may be of particular value in searching for a user of a wireless communication unit who has requested emergency assistance.

(ii) Lead to lower rates of dropped calls in the wireless communication network.

(iii) Allow more effective planning and installation of enhancements to a wireless communication network. With the invention, new base stations or upgraded antennae are more likely to be added to a wireless communications network both when and where they are needed.

BRIEF DESCRIPTION OF THE DRAWINGS

Exemplary embodiments of the present invention will now be explained with reference to the accompanying drawings.

DESCRIPTION OF PREFERRED EMBODIMENTS

Figure 4:
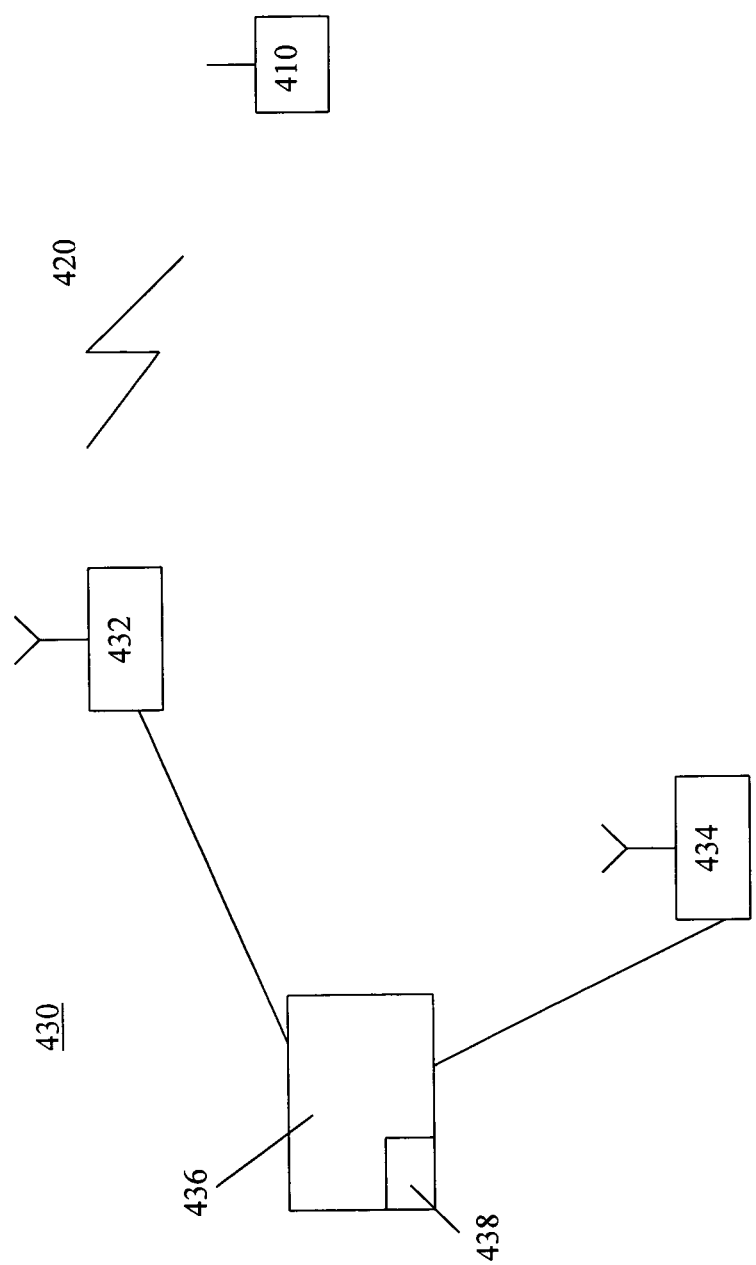
FIG. 4 shows an exemplary embodiment of a wireless communications system in accordance with the invention.

FIG. 4 shows an exemplary embodiment of a wireless communications system 400 in accordance with the invention. Wireless communication unit 410 is connectable via a wireless communication link 420 to a wireless communication network 430 of wireless communication system 400. Base stations 432 and 434, and control unit 436 all form part of wireless communication network 430. Communication link 420 may comprise a voice communication channel, or a data link.

Each base station 432, 434 provides signal coverage for a cell site of the wireless communication network 430. Each base station may comprise three antennae, each antenna directed so as to cover one sector of the cell.

In a typical large wireless communications system 400, there may be several thousand base stations 432, 434. There may be several million wireless communication units 410. There may be several million communications within the network in a typical 24 hour period.

When a wireless communication unit 410 initiates a communication, it may be able to receive signals from up to six base stations 432, 434. In this situation, the wireless communication unit will typically select the base station 432, 434 that provides the strongest signal, and place the communication through that base station. That base station is then the 'serving' base station for the communication. The wireless communication unit may therefore be able to record and provide information available about, for example, the signal strength for up to six base stations.

If the wireless communication device is a mobile phone that is making a voice call, then that call may typically last several minutes. The mobile phone will typically monitor the signal strength from up to six base stations 432, 434 during the call. If the signal strength of the serving base station becomes unacceptably low, then the mobile phone will be able to continue the call through another base station. This is call handoff. If no other base station is available with sufficient signal strength, then call handoff will not be possible, and the call will terminate prematurely, which is referred to as a 'dropped' call.

The present invention is potentially able to use information on the signal strength available to all wireless communication units 410 in the network, both when initiating communications and during the communications. The invention may use this data for all communications made in the network, or for only a subset. For example, the invention may focus on a particular subset of calls, for example those calls that result in a 'drop'. The invention may also be focussed on the performance of only a part of the wireless communication network 430, or all of the base stations 432, 434.

In accordance with the invention, a probability density function is derived for the location of the wireless communication unit 410. The probability density function uses data from a communication between a wireless communication unit and at least two sectors of the wireless communication network 430. These sectors will normally be part of two different base stations 432, 434. The probability density function is derived from at least one of the group of:

(i) measurement information from the wireless communication unit 410;

(ii) network configuration data about the wireless communication network 430.

The probability density function may be derived by one of several of the components of the wireless communication system 400. For example, a processor 438 located in control unit 436 may derive the probability density function.

The probability density function can be sampled, to provide output information. This output information comprises both spatial information and probability information about possible locations for the wireless communication unit 410. Sampling of the probability density function may also occur in processor 438.

In an alternative arrangement, the probability density function may be derived in a separate system, which is not shown on FIG. 4. Such a separate system is particularly likely to be used when the probability density function is derived as part of 'post-processing', which does not take place in real time. Such post-processing may be carried out in a dedicated system outside of wireless communication system 400, using records of one or more communication links or calls. In some applications, the post-processing will be applied only to the records of selected communications. However, post-processing may be applied to the records of all communications within the wireless communication network 430, which may be a large number. Here the 'large number' may include many thousands or millions of call records.

One approach to implementing the invention would be simply to arrange for each of a group of mobiles of a mobile telephone system to provide data as an 'input'. The mobile telephones would provide their measurements to the Radio Access Network (RAN) of the mobile telephone system, which in turn provides the mobile measurements to the Operations Support System (OSS) of the mobile telephone system. The calculations necessary to perform the invention would be carried out in the Operations Support System (OSS). The Operations Support System of a mobile telephone system is normally connected directly to the Radio Access Network (RAN), so can easily receive measurements from the Radio Access Network.

The probability density function may be derived from at least two individual probability density functions, each individual probability density function being based on either:

(i) the measurement information from the wireless communication unit 410; or (ii) the network information about the wireless communication network 430.

Various techniques are available for calculating probability density functions. However, in accordance with the invention, the probability density function, or the two or more individual probability density functions may be created by parametric modelling, using one or more moments of a random variable distribution. The probability density function thus created will be such that the summation of the probabilities of all possible locations equals unity.

The spatial information and probability information about possible locations for the wireless communication unit may advantageously comprise:

(i) an x-coordinate and a y-coordinate for each possible location; and (ii) a probability of the wireless communication unit 410 being located at the x-coordinate and y-coordinate, the probability being derived from the probability density function.

In order to make the output information from the invention more user-friendly, the possible locations for the communications unit 410 with a probability less than a threshold value may be eliminated. This can be done, for example, using importance sampling. The output information would then comprise a list of all the possible locations for the wireless communication unit 410 with a probability greater than or equal to the threshold value. The user of the wireless communication unit 410 may be able to select how many possible locations for the wireless communications unit are included in the output information.

Once the probability density function has been calculated, the maximum of the function can be calculated. This provides a 'most likely' location for the mobile communication unit 410 at the time of making the communication. The probability of the mobile communication unit 410 being at that location also provides information on how likely it is that the mobile communication unit 410 was actually at the location, and this information may be used in the invention as a 'confidence' score.

The probability density functions from multiple communications can then be combined to produce a combined function. For example this combined function may comprise a statistical calculation, which is performed on the confidence scores derived from each probability density function. The statistical calculation may be the calculation of the median, for example. As a further example, the calculation may be a calculation of the mean, or of a fixed percentile such as the $80^{th}$ percentile of the distribution.

Analysis of the combined function allows the derivation of a most likely value for a network parameter, thereby generating a 'corrected' network parameter. One approach to this analysis comprises varying the network parameter one or more times, until a maximum value for the combined function has been reached. The value of the network parameter that maximises the combined function can then be selected as the most likely value for the network parameter. This form of analysis effectively involves varying the network parameter to one or more 'trial' values, to see if any of the trial values produces a higher overall level of confidence in the probability distribution functions of the communications that make up the combined function.

In a final step, the network configuration data can be corrected by incorporating the corrected network parameter.

Although the discussion above describes the derivation of a most likely value for one network parameter, the method of the invention may be used to derive most likely values for two or more network parameters simultaneously. The one or more network parameters are selected from the group of:

(i) antenna or base station location information;
(ii) antenna properties;
(iii) azimuthal and tilt pointing angles of a sector antenna;
(iv) transmitted power levels.

The invention may be applied in various ways to the task of correcting one or more network parameters of the network configuration date. Exemplary applications include the following:

Application (i):

Clusters of cells may be identified where the confidence scores over a geographical area of interest are unusually low. In this case, the network parameters for just those cells can be varied. In order to identify an area where confidence scores are low, the maxima of the probability density functions can be examined. The area covered by the wireless communications network can be divided up into geographical regions, for example bins of 100 meters×100 meters. A running total can be made of all communications or calls within each bin that have a confidence level lower than a threshold. Where the total number of communications is particularly high in a bin or a group of nearby bins, that fact may be used to identify a geographical area of interest. The cells near to that area may then be singled out for investigation, by varying their parameters to detect incorrect network parameters in the network configuration data held for them.

Application (ii):

In a variation on the approach in (i), the list of calls made through the network can be scrutinised to reveal only those calls that ended in a call being dropped. The locations of these calls can be marked, for example by recording them in geographical regions such as the bins described under (i) above. Typically less than 1% of calls are dropped in a network. However, where the network configuration data contains an error, this may have the consequence of raising the rate of dropped calls in the vicinity of the sector concerned. In this case, a rate of dropped calls of perhaps 1-5% might be observed in some of the bins in or near to the sector concerned. One or more network parameters of the sector concerned could then be varied. This might also be done for the next two sectors in any direction from the sector in which the rate of dropped calls is highest. This approach can be summarised as identifying geographical regions in the wireless communication network 430 where rates of dropped calls are higher than either a threshold rate or the mean rate across the network, and then varying the network parameters of cells or sectors to which communications may be made from the geographical regions.

Application (iii):

The wireless communication network may be monitored constantly, by selecting network parameters at random. Each selected parameter can then be checked, by varying it to see if another value is more appropriate.

Application (iv):

It is possible to look selectively at calls made near to one or more cells, which did not use the cells. By looking at one or more network parameters of those cells, it may be possible to vary the parameters in such a way as to find a better fit to the set of calls that the mobiles chose not to route through those cells. So, instead of looking at data on calls made, this approach looks at call options declined in favour of other base stations or sectors.

When applying the method of the invention to find the maximum value of the combined function, one or more network parameters need to be varied. In order to do this efficiently, decisions need to be made about the direction and/or step size for each variation. The direction and/or step size for each variation may be selected by the steepest descent method, Newton's method, simulated annealing, a Monte Carlo search, or a genetic algorithm, or other similar mathematical technique.

The output information of the invention may serve a wide variety of uses. The invention provides network configuration data of increased accuracy. By correcting network configuration data, the present invention may offer a number of advantages. In particular the invention may:

(i) Enable the calculation of more accurate values for the location of a wireless communication unit.

(ii) Lead to lower rates of dropped calls in the wireless communication network.

(iii) Allow more effective planning and installation of enhancements to a wireless communication network.

The invention may be performed by the Operations Support System (OSS) in a wireless network. This is because the invention may serve to help manage a network. Such an activity is usually considered to be distinct from the tasks involved in individual call processing, i.e. setting up and ending calls, billing, etc. The invention may be carried out on one or more computer workstations. These workstations may be dedicated to this task, which would be the usual approach. Alternatively, these workstations may perform other tasks, such as fault management or compiling switch statistics and maintenance reports, in addition to the present invention. These workstations may consist of general-purpose computers. However, they could also be composed of custom hardware, with specially-built printed-wiring cards & custom chips to accelerate the necessary calculations. Where all calls in a busy network are analysed, and all network configuration parameters are to be varied, such a custom type arrangement may provide greater speed of implementation of the method.

Although the invention may be used within the wireless communication network 430, the output information may also be displayed on a screen of the wireless communication unit 410. It is also possible for a smart-phone to be programmed to perform the method of the invention, rather than this being a function of the wireless communication network 430. Such a smart-phone could then pass through the network, and make measurements as it passes through and adjacent to sectors.

The invention may be arranged to operate with measurement information obtained by wireless communication units 410 that comprises one or more of the following:

(i) one or more absolute distances from the wireless communication unit 410 to one or more network sectors of the wireless communication network 430;

(ii) one or more differential distances between the wireless communication unit 410 and one or more pairs of network sectors of the wireless communication network 430;

(iii) one or more received signal powers recorded by the wireless communication unit 410 from one or more network sectors of the wireless communication network 430; and (iv) one or more measurements of the received signal-to-noise ratio recorded by the wireless communication unit 410 from one or more network sectors of the wireless communication network 430.

Figure 5:
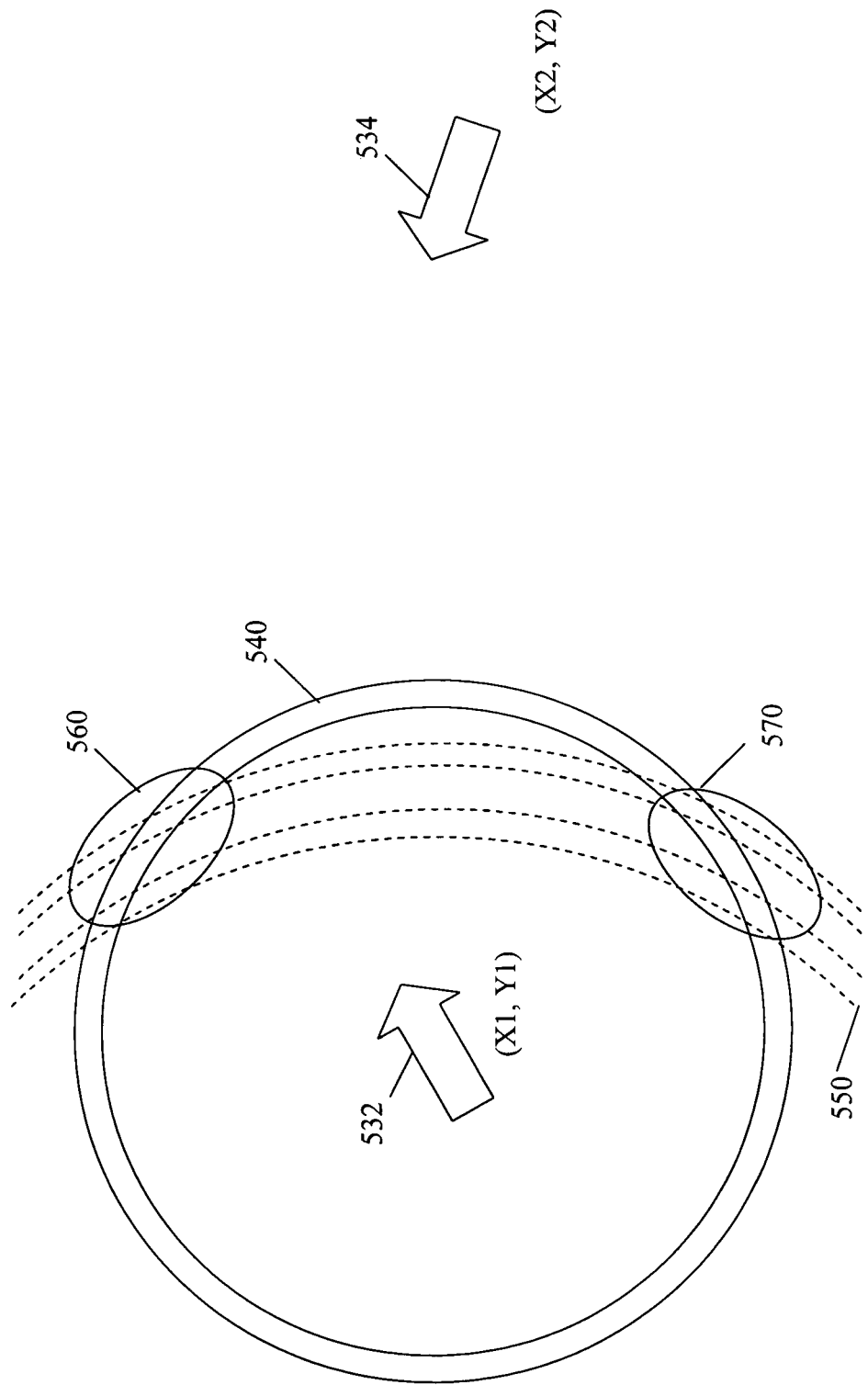
FIG. 5 shows an exemplary embodiment of a method in accordance with the invention.

FIG. 5 shows an exemplary embodiment of a method in accordance with the invention.

FIG. 5 shows first and second antennae 532, 534, which are part of two base stations such as base stations 432 and 434 of FIG. 4. First antenna 532 serves one cell of the wireless communications network. Second antenna 534 serves another cell of a wireless communications network such as network 430. The individual cells of the wireless communications network 430 are not shown on FIGS. 4 and 5, because their exact boundaries do not need to be known for the method of the invention. First and second antennae 532, 534 are sectorised antennae. First antenna 532 is located at position (X1, Y1), covering a first sector. Second antenna 534 is located at position (X2, Y2), covering a second sector.

Each of first and second antennae 532 and 534 focuses its transmitted energy. This focussing is such that most of the energy falls within a certain range of angles of azimuthal beam width. The range might be, typically, 45 to 90 degrees, centred about the azimuthal pointing angle. The direction of each of the arrows 532, 534 in FIG. 5 shows the azimuthal pointing angle for that antenna.

Assume now that a wireless communication unit, such as unit 410 shown in FIG. 4, is somewhere in the wireless communications network of FIG. 5, and performs a first measurement. The first measurement is of the distance to first antenna 532. The first measurement may be either a direct or an indirect measurement. FIG. 5 illustrates the probability information that is available from a wireless communication unit whose location is uncertain, so no wireless communications unit is actually shown on FIG. 5.

Figure 1:
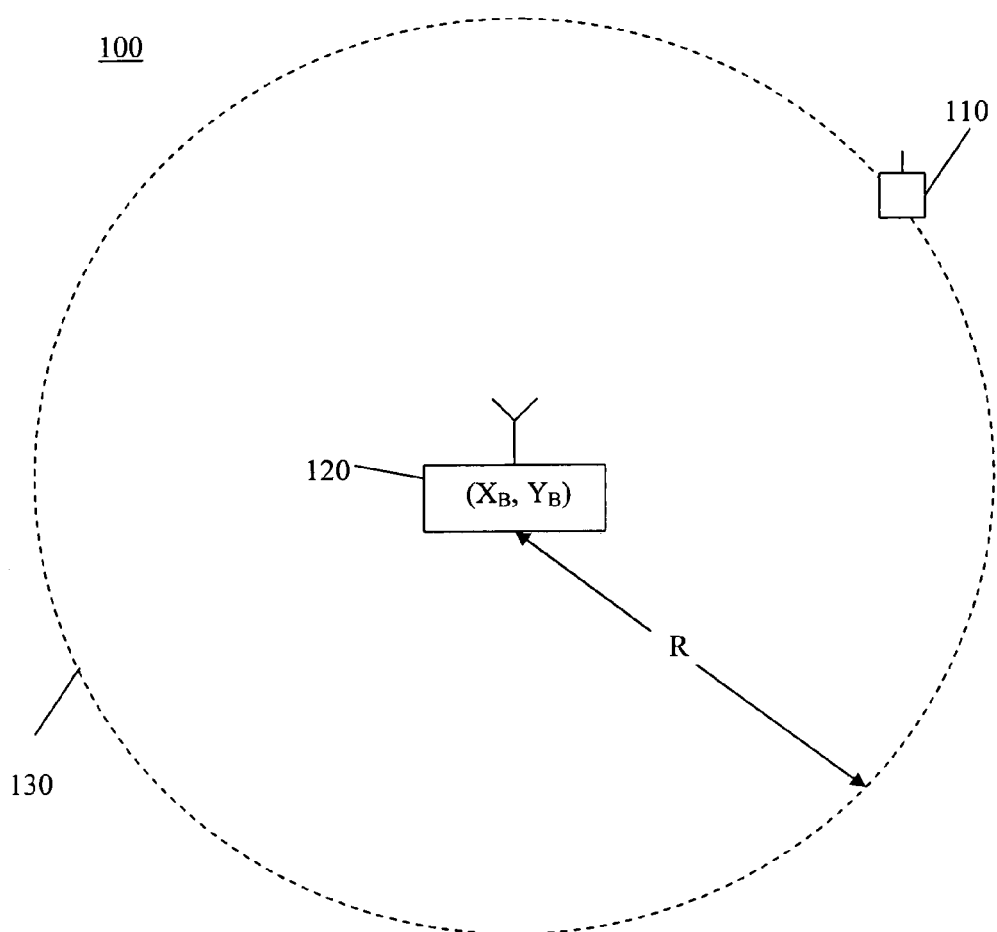
FIGS. 1-3 show wireless communication systems, and illustrate the limitations of prior art geo-location methods.
Figure 2:
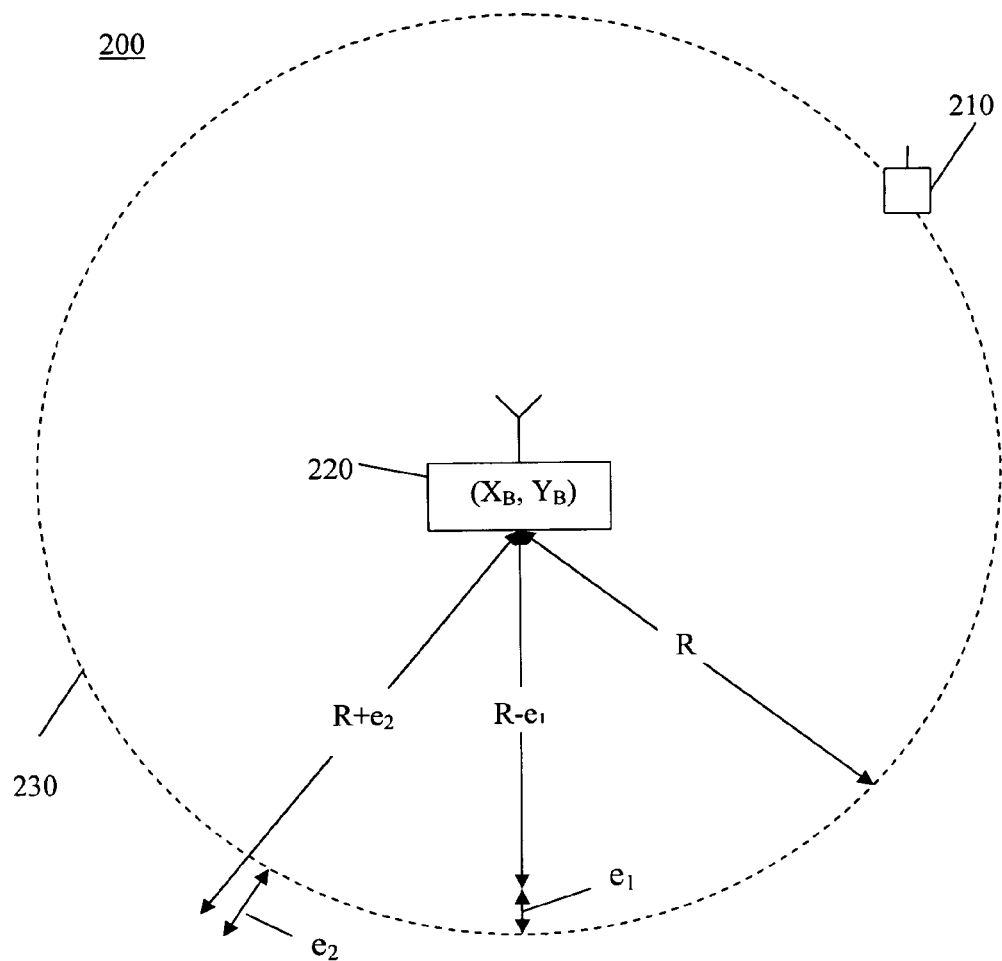
Figure 3:
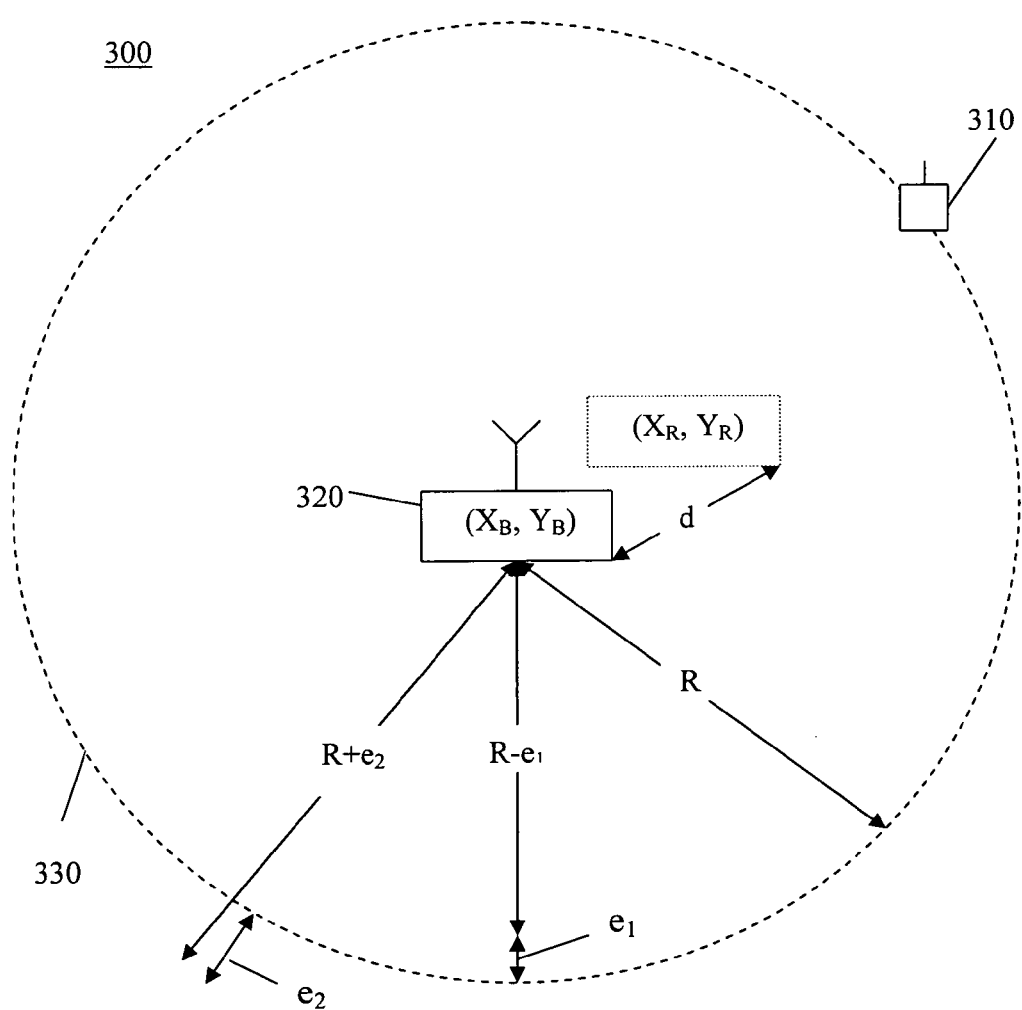

The first measurement results in a first probability density function. The solid double circle 540 illustrates the probability information, which is derived from the first probability density function. First antenna 532 lies at the centre of both of the circles 540. The double circle 540 corresponds to two contours of equal probability of finding the wireless communications unit. This measurement is generally similar to that described in connection with FIG. 3.

The mobile communication unit is also able to perform a second measurement, which is of the distance to the second antenna 534 in FIG. 5. However, the second measurement yields a differential distance measure, relative to the first sector that contains first antenna 532. The differential distance measure might be obtained from the Time Difference of Arrival, the 'TDOA', of communication signals. The second measurement provides a second probability density function.

The four dotted lines generally indicated by reference 550 in FIG. 5 illustrate probability information derived from the second probability distribution function. The four dotted lines are contours of equal probability, and each takes the form of a hyperbola. The geometrical parameters of the hyperbola depend on the locations of the first and second sectors, and the differential distance quantity.

Both double circle 540 and the four hyperbolae 550 are in fact a dense sampling of points from their respective probability density functions.

In order to locate the wireless communications unit, it is necessary to combine the first and second probability density functions. This is because the probability of the wireless communication unit being at a particular location is the conjunction of independent events, i.e.:

(i) The mobile communication unit being located a distance from antenna 532 corresponding to approximately the radius of one of the circles 540;

(ii) A Time Difference of Arrival of a given value; and (iii) Mobile visibility of the first and second sectors.

The first and second probability density functions need to be suitably scaled when making this combination.

In the example of FIG. 5, the most precise information is derivable by combining the first and second probability density functions with the probability density functions associated with the antennae 532, 534. This is because users are more likely to be served in the main lobe of each antenna than in the back lobe, or in a side lobe of the antenna. If both first and second antenna had been identical omnidirectional antennae, there would be no need to include their probability density functions in the combination.

The possible locations for the wireless communication unit are in first and second ovals 560 and 570. These show the locations where the combined probability density functions lead to the highest probability values. The most likely value for the location of the wireless communication unit is a single point towards the centre of first oval 560, because of the pointing angles of the antennae.

As explained above, network configuration data is often in error. Locations of cell sites can be incorrect by hundreds of meters or more. Azimuths of antennae can be off by tens of degrees.

Figure 6:
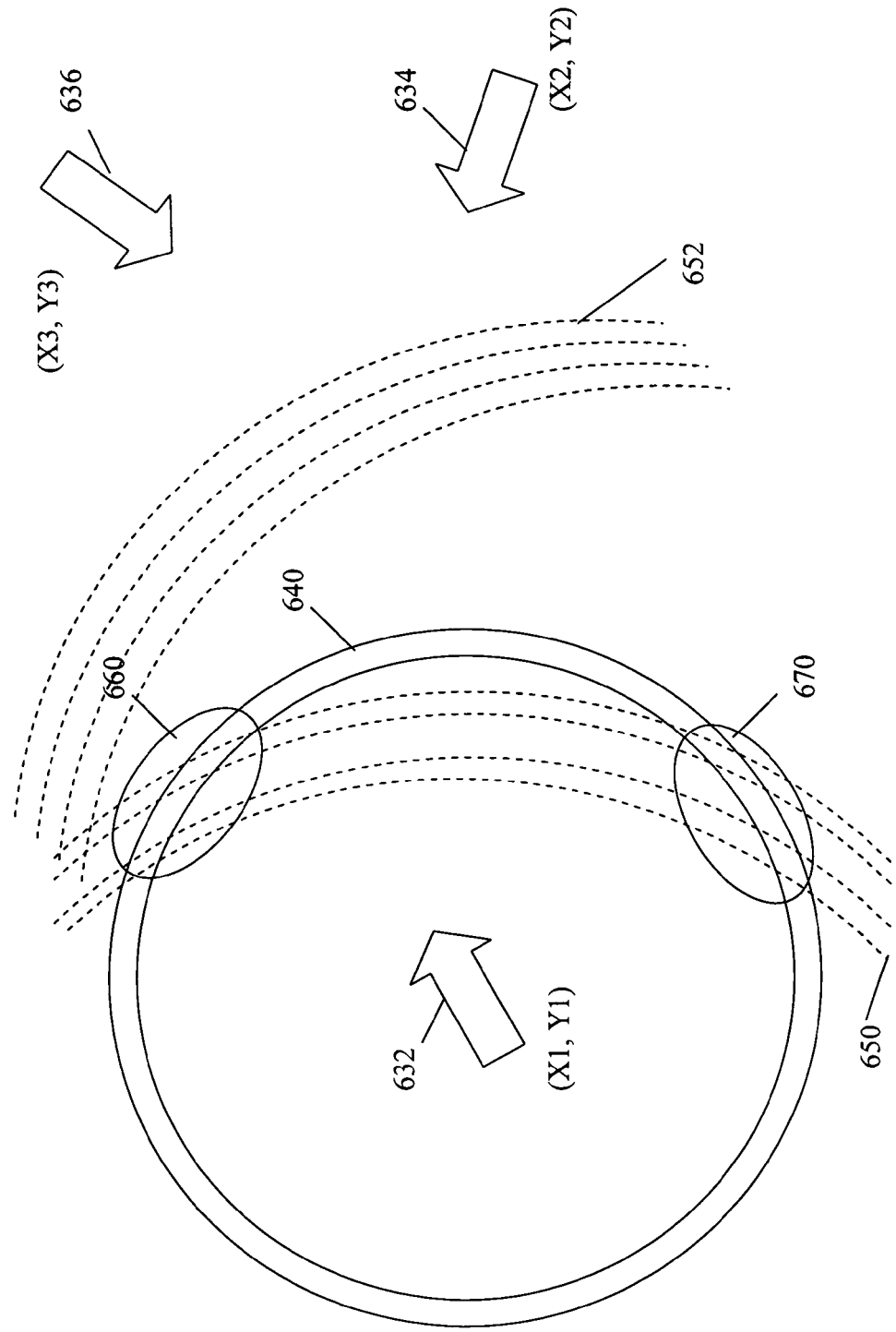
FIG. 6 shows a mobile communications network with erroneous location data for an antenna.
Figure 7:
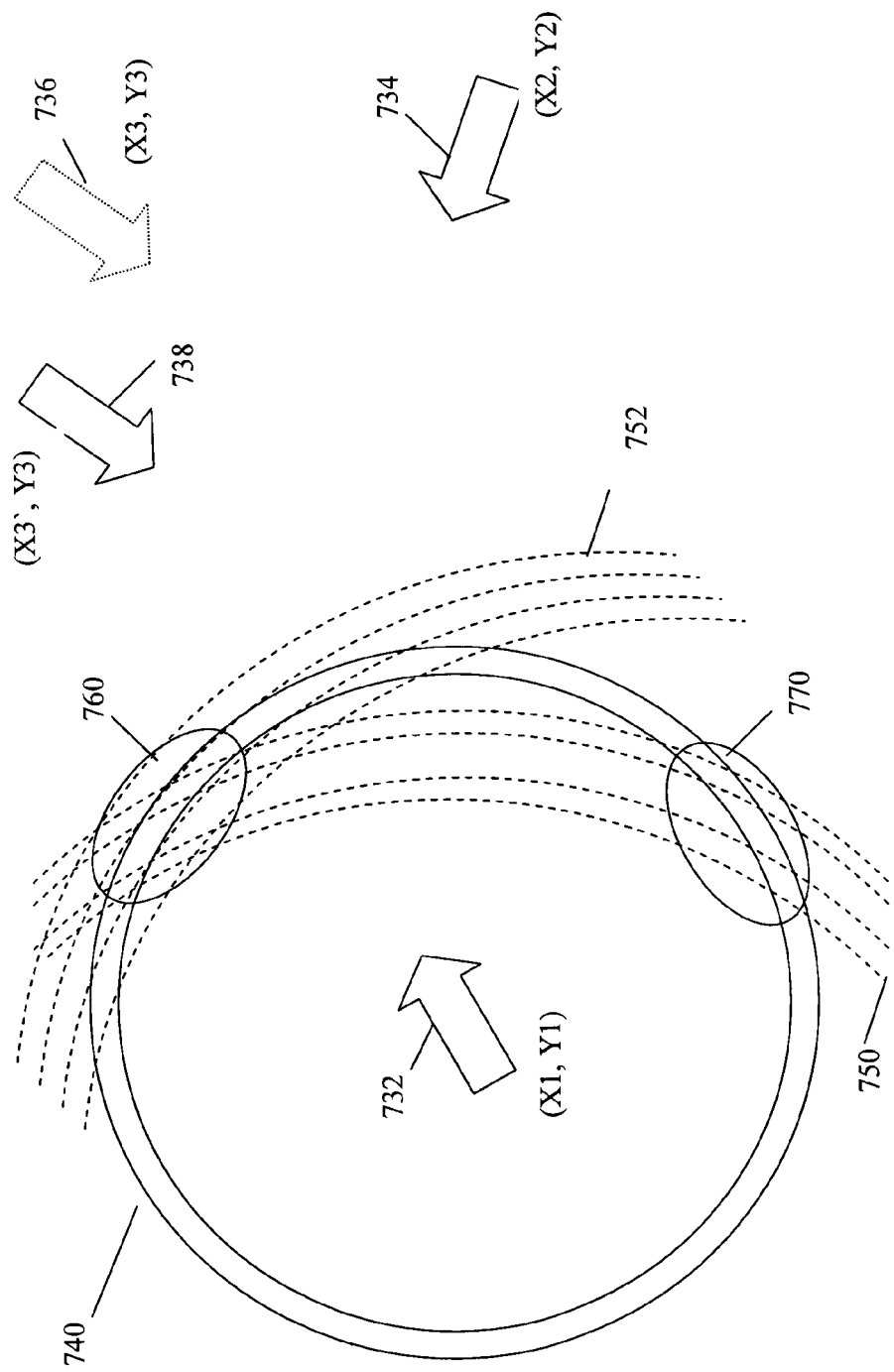
FIG. 7 shows the mobile communications network of FIG. 6, with correct location data for all antennae.

FIGS. 6 and 7 illustrate a situation that may arise when the x-coordinate of an antenna is incorrect.

In FIG. 6, antennae 632, 634, double circles 640, hyperbolae 650 and ovals 660, 670 correspond to the similarly numbered elements on FIG. 5.

In FIG. 6, antenna 636 is also within communication range of the wireless communication unit. The network configuration data for antenna 636 lists the location of antenna 636 as (X3, Y3).

The wireless communication unit is able to perform a Time Difference of Arrival measurement between signals from antennae 632 and 636. The resulting probability density function provides hyperbolae 652, which show contours of equal probability.

Hyperbolae 652 do not run through oval 660, and do not intersect circles 640 at any point. If the information represented by hyperbolae 652 is combined with that of hyperbolae 650 and circles 640, the overall calculated probability of the wireless communication unit being located in oval 660 falls, relative to that derived in FIG. 5.

The situation shown in FIG. 6 arises due to an error in the location data (X3, Y3) held for antenna 636 as part of the network configuration data.

The information shown in FIG. 6 may have been derived from signals received by one wireless communication unit, which communicates once each with antennae 632, 634 and 636. In this scenario, there is insufficient information to ascertain how the error has arisen. It could be the case that the measurement data is in error for this call, or it could be the case that the network configuration data is in error. An error in the network configuration data may concern the location of the centre of circles 640 and/or the location of the foci of either set of hyperbolae 650 or 652. The noisy character of mobile measurements makes it impossible to determine which of these scenarios is the case, when data is only available from, for example, a single call.

However, consideration of more than one call, in aggregate, does allow for determination of network errors. This determination is possible because fluctuations that are observed within individual calls will tend to average out over multiple calls. So, if the error is due to noise in the measurement data, this will average out statistically. However, if the error is due to incorrect network configuration data, then that error will appear more consistently across all location estimations involving the erroneous data. For example, an incorrect antenna pointing angle or position might lead to diffuse probability density functions, rather than sharp probability density functions, for all the location measurements in which that antenna is involved.

The set of calls available may comprise calls made over a limited period of time, and/or in a portion of the wireless network of limited geographical extent. The period of time and geographical extent depend partly on how many wireless communication units are using the network. In general, the more calls used in the method of the invention, the more accurate the information that can be derived from them.

FIG. 7 shows the correct location for the third antenna, which is antenna 738 on FIG. 7. The correct location is (X3', Y3). For ease of comparison, the incorrect location data (X3, Y3) is also shown on FIG. 7. The incorrect location is shown as a dotted image of an antenna 736 on FIG. 7, which corresponds to antenna 636 in FIG. 6.

In FIG. 7, antennae 732, 734, double circles 740, hyperbolae 750 and ovals 760, 770 all correspond to the similarly numbered elements on FIGS. 5 and 6.

The hyperbolae 752 are derived from a Time Difference of Arrival measurement between signals received by the mobile communications unit from antennae 732 and 738. However, the calculated probability density function in the arrangement of FIG. 7 incorporates the correct location information for antenna 738, which is location (X3', Y3). As a consequence, hyperbolae 752 run through oval 760.

The situation shown in FIG. 7 corresponds to what would be expected, when a position estimate can be derived from communicating with three antennae 732, 734, 738, rather than the two antennae 532, 534 in FIG. 5. Essentially, the availability in FIG. 7 of additional positional information provided by the availability of a third antenna enhances the accuracy of the location estimate that is possible. The hyperbolae 752 increase the combined probability of the mobile communication unit being in oval 760, and decrease the probability of it being located in oval 770, relative to the probabilities known from FIG. 5.

Summarizing FIG. 7, displacement of the network configuration data for third antenna 738 to a new x-coordinate of X3' causes hyperbolae 752 to better intersect with hyperbolae 750 and the circles 740. This has the result, for a single communication from a mobile communications unit, that the probability density function will have a greater maximum than was the case in FIG. 6. The maximum value of the probability density function can be used as a 'confidence' measure, since the greater this value is, the greater the overall agreement between the various measurement and network configuration values.

Across all calls under study, the confidence scores of individual location measurements can be subject to a suitable measure. Examples of suitable measures are median, or average or 75th percentile. These measures provide an understanding of how changes in network parameters such as X3 can affect the overall confidence scores. All measurements from calls that are available may be used to construct the relevant statistical measure, and no measurements need be discarded. For example, if there were five measurements equal to 0.1, 0.2, 0.3, 0.4 and 0.5, the median is 0.3. In its broadest from, the invention uses the maximization of the confidence measure to permit the correction of network errors, as demonstrated in FIG. 7. The correction of the network configuration data, may in turn, yield improved geolocation estimates for the wireless communication units and other benefits.

Figure 8:
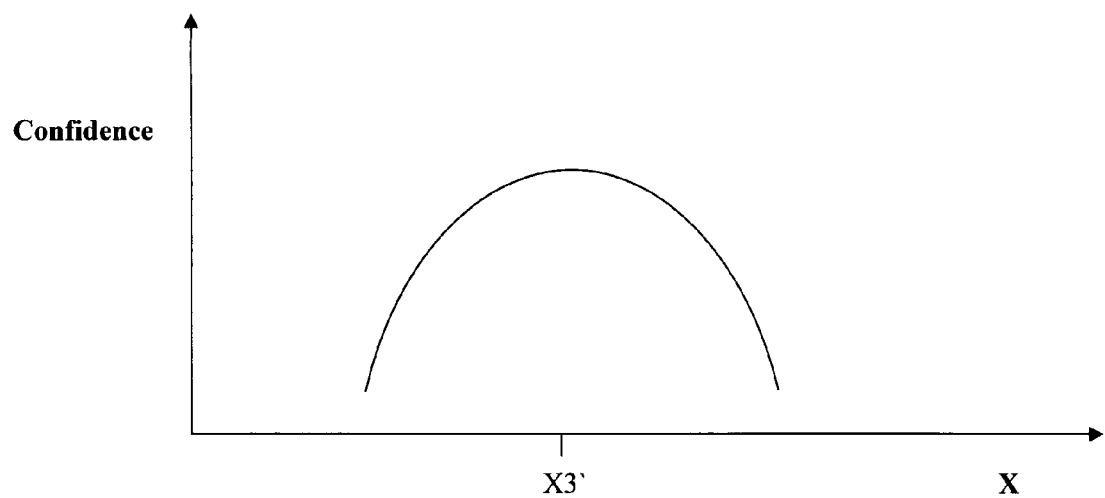
FIG. 8 is a graph of the confidence in a location co-ordinate of an antenna.

FIG. 8 illustrates one way of finding the value X3'. Across a large number of calls, the confidence in measures of X can be calculated. The resulting distribution is shown in FIG. 8. The x-axis shows the value of co-ordinate X for the location of antenna 738. The y-axis of the distribution shows the confidence in each measurement. The distribution peaks at point X3'. The most likely location of antenna 738 is therefore at location (X3', Y3), as shown in FIG. 8.

Considering the case shown in FIG. 7, only X3 needs to be corrected. Each communication made by a mobile communication unit 410 can contribute a confidence score, and these confidence scores can be used to achieve the correction of X3 to X3'. The value of X3 can be varied until a combined function of the confidence scores reaches its maximum, at which X3 will have the value X3'. The function chosen might be the median, average, or 75th percentile, for example. There are a variety of techniques well-known in the art to accomplish this maximization. Examples are the steepest descent, Newton's method, and simulated annealing. So, the method of the invention comprises maximizing the chosen function of the confidence scores, across all observed calls.

There needs to be some fraction of communications by wireless communication units that are in a position to witness more than one sector, in order for this approach to work. However, mobility/handoff objectives for modern wireless networks will satisfy this requirement. It is possible to see why this is the case by considering a situation in which mobile communication units could never witness more than one sector. In such a scenario, calls would always drop when the mobile moved "too far" away from the only sector they could see. Since wireless networks typically have dropped call rates of less than 1%, the amount of overlap between sectors is in practice substantial in a modern network.

Figure 9:
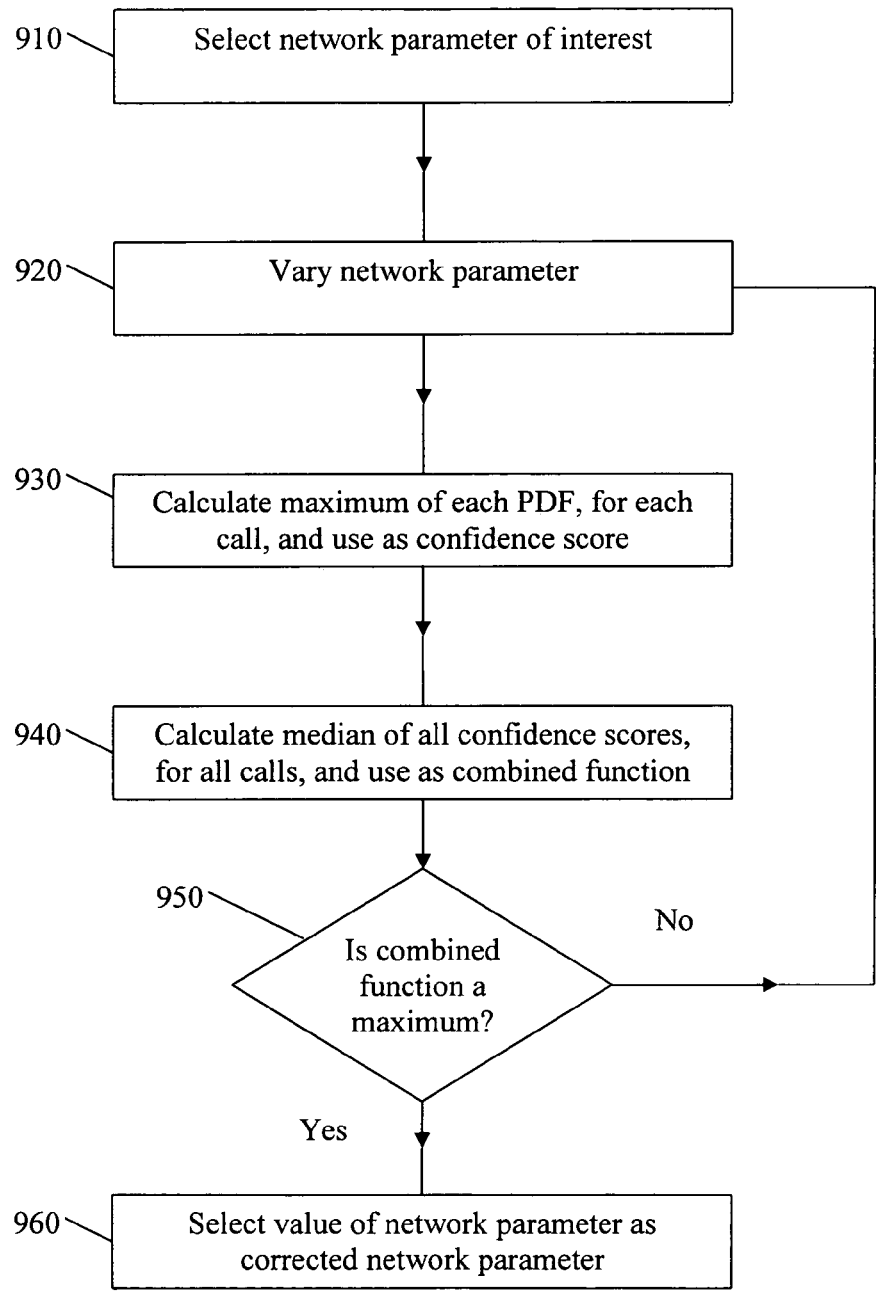
FIG. 9 illustrates a method for varying and potentially correcting a network parameter, in accordance with an embodiment of the invention.

FIG. 9 is a flowchart of one specific embodiment of the invention. The steps of FIG. 9 illustrate a detailed embodiment, in which:

(i) Only one network parameter is being varied;
(ii) The median of all confidence scores is used as the combined function.

The invention in its most general form is not limited to these specific aspects.

The first step, see reference 910, is to decide which network parameter is of interest. This network parameter might be, for example, the location of an antenna in a particular sector.

In the second step, see reference 920, the location of the antenna is varied from that held in the network configuration data. This variation creates a new 'trial' value for the location of the antenna.

In the third step, see reference 930, the probability density functions for all the communications made over a particular period are re-calculated, using the trial value for the location of the antenna. In the embodiment of FIG. 9, the communications are the calls made on mobile phones. The maximum value of the probability density function for each call is then found, and used as the confidence score for that call. The re-calculation of the probability density functions needs only to be done for the subset of mobile phones that were able to communicate with the particular antenna at the time of making a call. This subset of mobile phones may include mobile phones that were able to record a signal strength measurement from the antenna, without actually placing a call through it, so is not restricted to those mobiles that actually made a call through that antenna.

In the fourth step, see reference 940, the combined function is re-calculated. In the embodiment of FIG. 9, the median is used as the combined function. The median of all the confidence scores provides a simple number.

In the fifth step, see reference 950, a decision is made whether the combined function has reached a maximum. If the answer is no, then the method returns to step 2, see reference 920. A further variation will be made to the antenna location, and this second trial location will then be used in steps three, four and five.

If the combined function has reached a maximum, then the method proceeds to the sixth step, see reference 960. The trial antenna location that was selected in the second step can be used as the corrected network parameter. The network configuration data is then updated with the corrected network parameter.

With the method of FIG. 9, an incorrect value for an antenna location stored in the network configuration data can be corrected. This may be achieved using only details of calls made through the wireless communication network during normal usage of the network. The invention may therefore obviate the need for an engineer or technician to visit each base station in a wireless communications network.

The flowchart of FIG. 9 illustrates the variation of only one network parameter. In a wireless communication network, it would normally be desirable to check several network parameters. This would be more likely to reveal and correct errors in the network configuration data.

Figure 10:
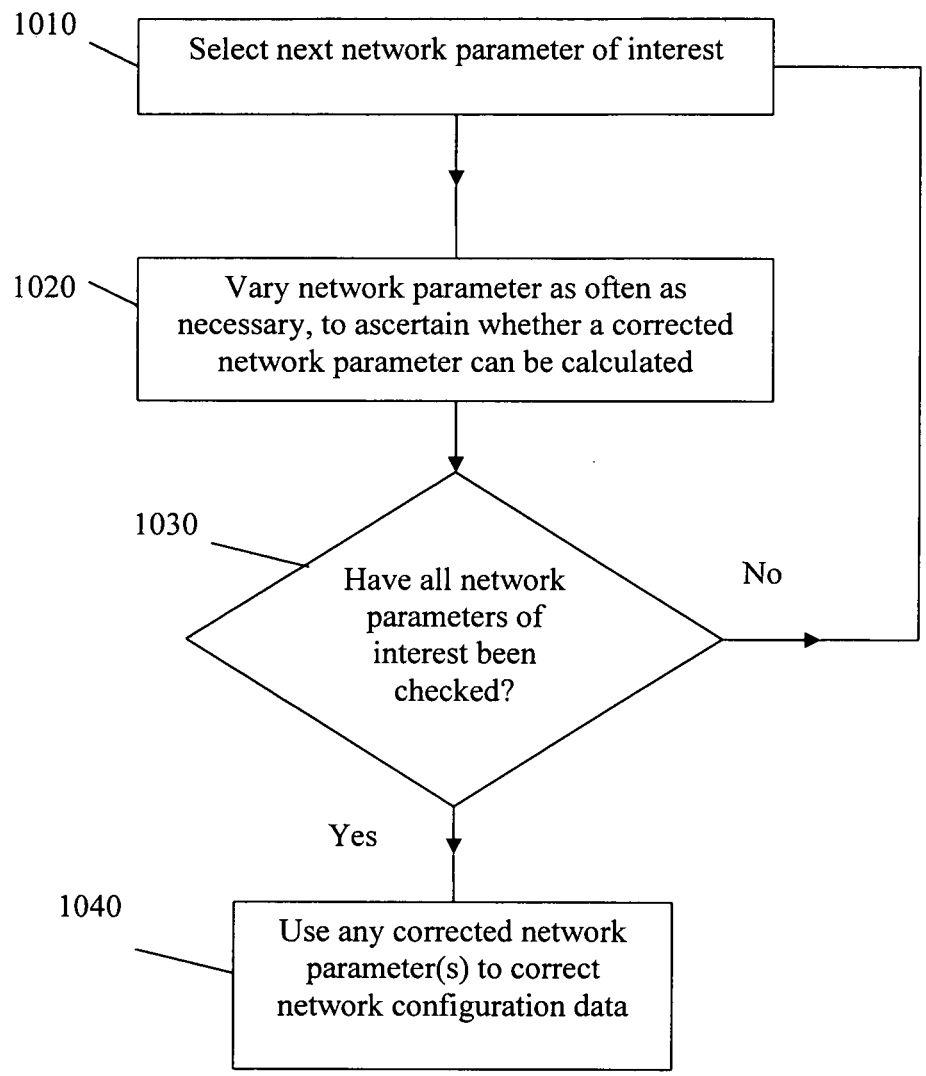
FIG. 10 illustrates one approach to varying and potentially correcting multiple network parameters, in accordance with an embodiment of the invention.

FIG. 10 illustrates one approach to varying and potentially correcting multiple network parameters, in accordance with an embodiment of the invention.

In the first step, see reference 1010, a network parameter of interest is selected. This might be the location of an antenna.

In the second step, see reference 1020, the antenna location is varied as often as necessary to ascertain whether a better value for the location can be derived from the available call data. The second step of the method of FIG. 10 may therefore correspond to the second through to the sixth steps of the method of FIG. 9, see references 920-960.

In the third step, see reference 1030, a decision is made whether or not all the network parameters of interest have been checked. If the answer is 'no', then the method returns to the first step. Another network parameter, such as azimuthal pointing angle of an antenna or the location of an antenna in a different sector, will then be selected.

In step 1030, if all the network parameters of interest have been checked and, potentially, been corrected, then the answer is 'yes'. In this case, the method proceeds to step 1040. In step 1040, any corrected network parameter(s) are used to correct the network configuration data.

The present invention also comprises a computer program product comprising executable program code for the method of the invention as described above.

Finally, a greatly simplified numerical example is provided below. This example is designed to aid understanding of the invention, but the invention is not limited to any detail of this example:

This example considers the simple, and unrealistic, case of only 3 calls. An example of the combined function in this case would be to take the median of the confidence scores for each call. If these 3 calls had confidence scores of 0.01, 0.02 and 0.03, then the median is 0.02. These confidence scores apply for some initial collection of network parameters that can be called 'configuration A'. Assume then that configuration B represents a different set of network parameters. If configuration B changed the confidence scores of the three calls to 0.02, 0.03 and 0.04, then the *NEW* median is 0.03. Configuration B would then be deemed to be "more likely" than configuration A. Across all possible network configurations A-X, suppose we find a set of network parameters, 'configuration C', that maximized the median score to be 0.04. This might be achieved if the confidence scores for all three calls were 0.03, 0.04 and 0.05. Then we consider network configuration C to be the most likely network configuration of all. By extension of this principle, if in the C configuration, the azimuth of some antenna is 'theta(c)', then the error in the initial network, which was configuration A, would be deemed to be the difference '(theta(c)-theta(a))'.

Consider the more general case of many calls (N much larger than 3), for which each call has a confidence score, $c\_i$ (i=1, 2, 3, . . . , N). Let the quantity f, the average confidence score, be defined in the usual way f=1/N sum ($c\_i$). Since the confidence scores for individual calls are a function of the network configuration, the average confidence score is also a function of the network configuration, or f=f(a) where a is some network configuration under consideration. The network configuration a_max that maximizes the value of f is called the most likely network configuration. To quantify this example, let the network configuration be defined by two parameters x1 & x2 which are each allowed to vary between 0 and 1. The network configuration variable a is then the vector (x1,x2). Further, let the average confidence score be perfectly modelled by f(a)=f(x1,x2)=x1*x2.

Then the function f(x1,x2) is maximized when x1=x2=1. Thus, the most likely network configuration is a_max=(1,1).

The above examples illustrate that it is possible to vary several parameters at one time. In effect any network parameters that are held as part of the network configuration data may be varied. The invention may be applied by:

(i) Varying one parameter only. This approach was explained in connection with the flowchart of FIG. 9.

(ii) Varying several network parameters, but analysing the effects on the combined function of only varying one network parameter at a time. This approach was explained in connection with the flowchart of FIG. 10.

(iii) Varying several network parameters concurrently. In this approach, the combined function would only be analysed after each step in which two or more network parameters were varied.

In a large network, it is likely to be more common to use approach (ii) or (iii), i.e. to not limit the selection to a single parameter. However, there are circumstances in which there might be a user-specified focus on one parameter, or some relatively-small subset of all parameters, if desired. The invention is suitable for considering the modifications to a relatively large collection of parameters under study.

In a serial example of what the invention can achieve, the invention would be used to pick each parameter, one-at-a-time, as illustrated by FIG. 9. This then enables an assessment of the extent to which change of that parameter impacts a confidence measure such as that shown in FIG. 8. Those sectors with the most impact could then be changed in concert, especially for co-located sectors at one base station. Parallel examples can be constructed by picking clusters of cells, where the confidence scores over an area of interest are unusually low. This is often evidence of errors in the network information somewhere in the vicinity of the region under study.

It will be appreciated that, for clarity purposes, the above description has described embodiments of the invention with reference to different functional units. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. Aspects of the invention may optionally be implemented, at least partly, as computer software running on one or more data processors and/or digital signal processors. Thus, the elements and objects of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with embodiments of the invention.

Additionally, although individual features may be included in different claims, these may possibly be advantageously combined, and the inclusion in different claims does not imply that a combination of features is not feasible and/or advantageous. Also, the inclusion of a feature in one category of claim does not imply a limitation to this category, but rather the feature may be equally applicable to other claim categories, as appropriate.

The order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method of correcting network configuration data, the network configuration data describing a wireless communication network in a wireless communication system, the wireless communication system comprising wireless communication units and comprising at least two sectors;
the network configuration data comprising at least one network parameter;
the method comprising:
a) communicating using at least one wireless communication units via wireless communication links with at least two sectors of the wireless communication network;
b) deriving a probability density function for a location of each wireless communication unit communicating in step a), from at least one of the group of:
(i) measurement information from the wireless communication unit;
(ii) the network configuration data;
c) combining the probability density functions from multiple communications to provide a combined function;
d) analyzing the combined function to derive a most likely value for a network parameter, thereby generating a corrected network parameter; and
e) correcting the network configuration data by incorporating the corrected network parameter.

2. A method of correcting network configuration data as in claim 1, wherein:
step c) comprises calculating a confidence score for each probability density function incorporated in the combined function, and calculating the value of the combined function from the confidence scores; and
step d) comprises varying the network parameter until a maximum value for the combined function has been reached, and selecting the value of the network parameter that maximizes the combined function as the most likely value for the network parameter.

3. A method of correcting network configuration data as in claim 2, wherein:
step d) includes analyzing the combined function to derive most likely values for two or more network parameters, thereby generating two or more corrected network parameters; and
step e) comprises correcting the network configuration data by incorporating the corrected network parameters.

4. A method of correcting network configuration data as in claim 3, wherein:
the step of varying the two or more network parameters involves selecting each network parameter of interest in turn, and analyzing how changes to the parameter impact on the combined function.

5. A method of correcting network configuration data as in claim 4, wherein:
corrected network parameters are generated for the sectors most affected by varying each parameter.

6. A method of correcting network configuration data as in claim 3, wherein:
the step of varying the two or more network parameters involves varying two or more of the network parameters of interest simultaneously, and analyzing how changes to the parameters impact on the combined function.

7. A method of correcting network configuration data as in claim 3, further comprising the steps of:
identifying clusters of cells where the confidence scores over an area of interest are unusually low; and
varying the network parameters for those cells.

8. A method of correcting network configuration data as in claim 3, comprising:
identifying geographical regions in the wireless communication network where rates of dropped calls are higher than either a threshold rate or the mean rate across the network; and
varying the network parameters of cells or sectors to which communications may be made from the geographical regions.

9. A method of correcting network configuration data as in claim 2, wherein the combined function is the median, the average, or a pre-determined percentile of the confidence scores.

10. A method of correcting network configuration data as in claim 1, wherein the at least one network parameters are selected from the group of:
antenna or base station location information;
antenna properties;
azimuthal and tilt pointing angles of a sector antenna; and
transmitted power levels.

11. A method of correcting network configuration data as in claim 1, wherein:
the maximum value of the combined function is found by varying one or more network parameters; and
the one or more network parameters are varied in a direction and/or step size selected by the steepest descent method, Newton's method, simulated annealing, Monte Carlo search, or a genetic algorithm.

12. A method of correcting network configuration data as in claim 1, wherein:
the probability density function of step b) is derived from at least two individual probability density functions, each individual probability density function being based on either or both of:
the measurement information from the wireless communication unit; or
the network configuration data.

13. A method of correcting network configuration data as in claim 1, wherein:
the individual probability density functions are created by parametric modeling, using one or more moments of a random variable distribution.

14. A method of correcting network configuration data as in claim 1, wherein the measurement information from the wireless communication unit comprises at least one from the group of:
one or more absolute distances from the wireless communication unit to one or more network sectors of the wireless communication network;
one or more differential distances between the wireless communication unit and one or more pairs of network sectors of the wireless communication network;
one or more received signal powers recorded by the wireless communication unit from one or more network sectors of the wireless communication network; and
one or more measurements of the received signal-to-noise ratio recorded by the wireless communication unit from one or more network sectors of the wireless communication network.

15. A method of correcting network configuration data as in claim 1, wherein the method is used in a wireless communication system.

16. A method of correcting network configuration data as in claim 1, wherein the method is used with a wireless smartphone.

17. A method of correcting network configuration data as in claim 1, wherein the method is operable with executable program code executable at least one computer.

* * * * *